(12) United States Patent
Rofougaran et al.

(10) Patent No.: US 9,692,489 B1
(45) Date of Patent: Jun. 27, 2017

(54) TRANSCEIVER USING NOVEL PHASED ARRAY ANTENNA PANEL FOR CONCURRENTLY TRANSMITTING AND RECEIVING WIRELESS SIGNALS

(71) Applicant: Movandi Corporation, Newport Beach, CA (US)

(72) Inventors: Ahmadreza Rofougaran, Newport Coast, CA (US); Farid Shirinfar, Granada Hills, CA (US); Sam Gharavi, Irvine, CA (US); Michael Boers, South Turramurra (AU); Seunghwan Yoon, Irvine, CA (US); Alfred Grau Besoli, Irvine, CA (US); Maryam Rofougaran, Rancho Palos Verdes, CA (US)

(73) Assignee: Movandi Corporation, Newport Beach, CA (US)

( * ) Notice: Subject to any disclaimer, the term of this patent is extended or adjusted under 35 U.S.C. 154(b) by 0 days.

(21) Appl. No.: 15/256,038

(22) Filed: Sep. 2, 2016

(51) Int. Cl.
*H04B 7/04* (2017.01)
*H04B 7/185* (2006.01)
*H04B 7/06* (2006.01)

(52) U.S. Cl.
CPC ............ *H04B 7/04* (2013.01); *H04B 7/0617* (2013.01); *H04B 7/185* (2013.01)

(58) Field of Classification Search
CPC ......... H04B 7/04; H04B 7/0617; H04B 7/185
USPC ............................ 455/562.1, 575.7
See application file for complete search history.

(56) References Cited

U.S. PATENT DOCUMENTS

| | | | | |
|---|---|---|---|---|
| 4,739,334 A | * | 4/1988 | Soref | .................. H01Q 3/2676 342/200 |
| 6,307,507 B1 | * | 10/2001 | Gross | ..................... H01Q 1/288 342/354 |

* cited by examiner

*Primary Examiner* — Raymond Dean
(74) *Attorney, Agent, or Firm* — Farjami & Farjami LLP (57) ABSTRACT

A wireless transceiver using a phased array antenna panel for concurrently transmitting and receiving wireless signals is disclosed. The wireless transceiver includes receive antennas forming a receive configuration and transmit antennas forming a transmit configuration. The receive antennas form a receive beam at a receive frequency based on phase and amplitude information provided by a master chip in the phased array antenna panel. The transmit antennas form a transmit beam at a transmit frequency based on phase and amplitude information provided by the master chip in the phased array antenna panel. The phase and amplitude information for the receive antennas is provided by an RF front end chip that is connected to the master chip. The phase and amplitude information for the transmit antennas is provided by the RF front end chip that is connected to the master chip.

19 Claims, 8 Drawing Sheets

TRANSCEIVER USING NOVEL PHASED ARRAY ANTENNA PANEL FOR CONCURRENTLY TRANSMITTING AND RECEIVING WIRELESS SIGNALS

RELATED APPLICATION(S)

The present application is related to U.S. patent application Ser. No. 15/225,071, filed on Aug. 1, 2016, and titled "Wireless Receiver with Axial Ratio and Cross-Polarization Calibration," and U.S. patent application Ser. No. 15/225,523, filed on Aug. 1, 2016, and titled "Wireless Receiver with Tracking Using Location, Heading, and Motion Sensors and Adaptive Power Detection," and U.S. patent application Ser. No. 15/226,785, filed on Aug. 2, 2016, and titled "Large Scale Integration and Control of Antennas with Master Chip and Front End Chips on a Single Antenna Panel," and U.S. patent application Ser. No. 15/255,656, filed on Sep. 2, 2016, and titled "Novel Antenna Arrangements and Routing Configurations in Large Scale Integration of Antennas with Front End Chips in a Wireless Receiver." The disclosures of these related applications are hereby incorporated fully by reference into the present application.

BACKGROUND

Satellite communications generally use different frequency bands for receiving and transmitting wireless communications signals, where the frequencies of the receive and transmit signals can be, for example, about 2 GHz apart. As a result, a wireless transceiver can utilize different antenna elements for receiving and transmitting signals in communicating with a satellite. In conventional wireless transceivers that can establish two-way communications to and from satellites, transmit antennas and receive antennas can be arranged on separate antenna panels. In this conventional approach, the transmit panel and the receive panel can be oriented and adjusted separately so that both panels can align precisely with, for example, a target satellite. However, in this conventional approach, wireless transceivers would have a large size due to two separate antenna panels, and would also require a large number of processing elements and complex routing networks to coordinate the transmission and reception operations, which can lead to undesirable signal delays, and high implementation cost and complexity.

SUMMARY

The present disclosure is directed to a transceiver using novel phased array antenna panel for concurrently transmitting and receiving wireless signals, substantially as shown in and/or described in connection with at least one of the figures, and as set forth in the claims.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
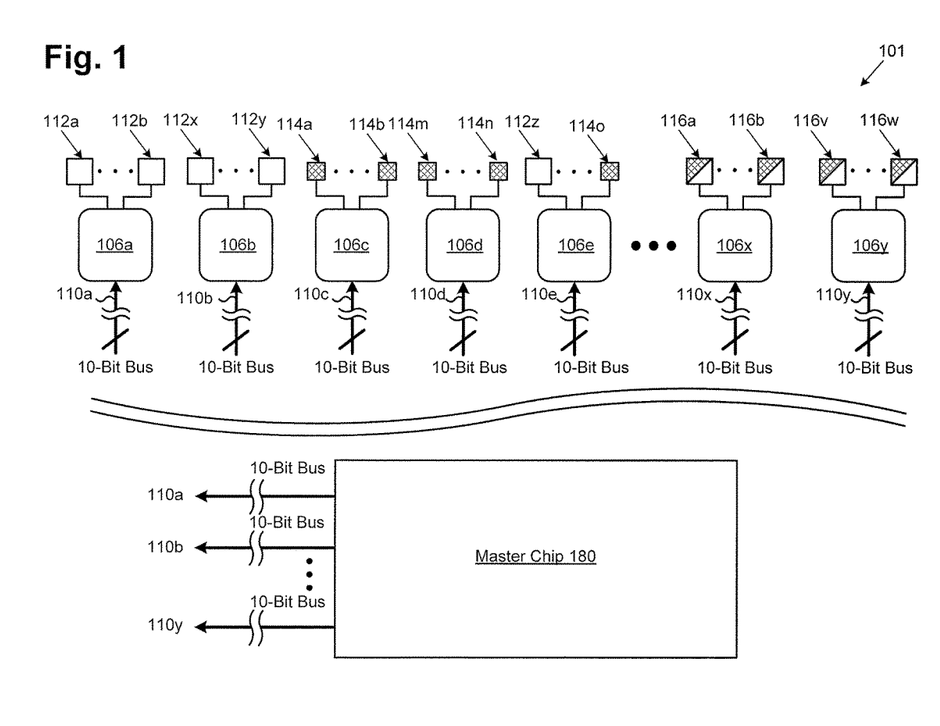
FIG. 1 illustrates a functional block diagram of a portion of an exemplary wireless transceiver according to one implementation of the present application.

Referring now to FIG. 1, FIG. 1 illustrates a functional block diagram of a portion of an exemplary wireless transceiver according to one implementation of the present application. As illustrated in FIG. 1, wireless transceiver 101 includes radio frequency (RF) front end chips 106a, 106b, 106c, 106d, 106e, 106x, and 106y (collectively referred to as RF front end chips 106a through 106y), receive antennas 112a, 112b, 112x, 112y and 112z (collectively referred to as receive antennas 112a through 112z), transmit antennas 114a, 114b, 114m, 114n and 114o (collectively referred to as transmit antennas 114a through 114o), reconfigurable receive/transmit antennas 116a, 116b, 116v and 116w (collectively referred to as reconfigurable receive/transmit antennas 116a through 116w), and master chip 180. In the present implementation, wireless transceiver 101 includes receive antennas 112a through 112z, transmit antennas 114a through 114o and reconfigurable receive/transmit antennas 116a through 116w in a single phased array antenna panel for concurrently transmitting and receiving wireless signals.

As can be seen in FIG. 1, RF front end chip 106a is connected to a group of receive antennas, such as receive antennas 112a and 112b, while RF front end chip 106b is connected to a group of receive antennas, such as receive antennas 112x and 112y. RF front end chip 106c is connected to a group of transmit antennas, such as transmit antennas 114a and 114b, while RF front end chip 106d is connected to a group of transmit antennas, such as transmit antennas 114m and 114n. RF front end chip 106e is connected to one or more receive antennas, such as receive antenna 112z, and one or more transmit antennas, such as transmit antenna 114o. RF front end chip 106x is connected to a group of reconfigurable receive/transmit antennas, such as reconfigurable receive/transmit antennas 116a and 116b, while RF front end chip 106y is connected to a group of reconfigurable receive/transmit antennas, such as reconfigurable receive/transmit antennas 116v and 116w.

It should be noted that total numbers of receive antennas, transmit antennas, and reconfigurable receive/transmit antennas may vary to suit the specific needs of a particular application. For example, in one implementation, wireless transceiver 101 may include only receive antennas and transmit antennas in a single phased array antenna panel. In another implementation, wireless transceiver 101 may include receive antennas, transmit antennas, and reconfigurable receive/transmit antennas in a single phased array antenna panel. In yet another implementation, wireless transceiver 101 may include only reconfigurable receive/transmit antennas in a single phased array antenna panel.

In the present implementation, each receive antenna, such as receive antennas 112a through 112z, of wireless transceiver 101 may operate in a reception mode and provide a horizontally-polarized signal and a vertically-polarized signal, as a pair of linearly polarized signals, to a corresponding RF front end chip, such as RF front end chips 106a, 106b and 116e. Each of the RF front end chips may combine all of the horizontally-polarized signals, by adding powers and combining phases of the individual horizontally-polarized signals, from the group of corresponding receive antennas coupled thereto, and provide an H-combined output (not explicitly shown in FIG. 1) to master chip 180. Similarly, each of the RF front end chips may also combine all of the vertically-polarized signals, by adding powers and combining phases of the individual vertically-polarized signals, from the group of corresponding receive antennas coupled thereto, and provide a V-combined output (not explicitly shown in FIG. 1) to master chip 180. In the present implementation, master chip 180 is configured to receive the H-combined and V-combined outputs from each of the RF front end chips coupled to the receive antennas, and provide phase shift information/signals to phase shifters and amplitude control information/signals to various amplifiers (not explicitly shown in FIG. 1) in the RF front end chips through control buses, such as control buses 110a, 110b and 110e.

In the present implementation, each transmit antenna, such as transmit antennas 114a through 114o, of wireless transceiver 101 may operate in a transmission mode, and transmit a horizontally-polarized signal and a vertically-polarized signal, as a pair of linearly polarized signals, provided by a corresponding RF front end chip, such as RF front end chips 106c, 106d and 106e. In the present implementation, master chip 180 is configured to provide phase shift information/signals to phase shifters and amplitude control information/signals to various amplifiers (not explicitly shown in FIG. 1) in the RF front end chips through control buses, such as control buses 110c, 110d and 110e, to control amplitude and phase of horizontally-polarized signals and a vertically-polarized signals being transmitted by transmit antennas 114a through 114o.

In the present implementation, receive antennas 112a through 112z, and optionally one or more reconfigurable receive/transmit antennas 116a through 116w, form a receive beam at a receive frequency based on phase and amplitude information provided by master chip 180 to corresponding RF front end chips 106a, 106b and 106e in a phased array antenna panel, such as phased array antenna panel 202 shown in FIGS. 2A through 2F. Transmit antennas 114a through 114o, and optionally one or more reconfigurable receive/transmit antennas 116a through 116w, form a transmit beam at a transmit frequency based on phase and amplitude information provided by master chip 180 to corresponding RF front end chips 106c, 106d and 106e in the phased array antenna panel.

In the present implementation, each reconfigurable receive/transmit antenna, such as reconfigurable receive/transmit antennas 116a through 116w, of wireless transceiver 101 is coupled to a corresponding RF front end chip, and may operate in either the reception or transmission mode. For example, each reconfigurable receive/transmit antenna may receive or transmit a horizontally-polarized signal and a vertically-polarized signal, as a pair of linearly polarized signals, depending on the mode of operation it is in. Wireless transceiver 101 is configured to dynamically assign reconfigurable receive/transmit antennas 116a through 116w to operate in either the reception or transmission mode. As a consequence, the total number of the transmit antennas or the total number of the receive antennas on the phased array antenna panel can be increased.

For example, when reconfigurable receive/transmit antennas 116a through 116w are assigned to operate in the reception mode, each reconfigurable receive/transmit antenna may provide a horizontally-polarized signal and a vertically-polarized signal, as a pair of linearly polarized signals, to a corresponding RF front end chip, such as RF front end chips 106x and 116y. Each of the RF front end chips may combine all of the horizontally-polarized signals, by adding powers and combining phases of the individual horizontally-polarized signals, from the group of corresponding reconfigurable receive/transmit antennas coupled thereto, and provide an H-combined output (not explicitly shown in FIG. 1) to master chip 180. Similarly, each of the RF front end chips may also combine all of the vertically-polarized signals, by adding powers and combining phases of the individual vertically-polarized signals, from the group of corresponding reconfigurable receive/transmit antennas coupled thereto, and provide a V-combined output (not explicitly shown in FIG. 1) to master chip 180. Master chip 180 is configured to receive the H-combined and V-combined outputs from each of the RF front end chips coupled to the reconfigurable receive/transmit antennas, and provide phase shift signals to phase shifters, and amplitude control signals to various amplifiers, in the RF front end chips through control buses, such as control buses 110x and 110y. For example, when reconfigurable receive/transmit antennas 116a through 116w are assigned to operate in the transmission mode, each reconfigurable receive/transmit antenna may transmit a horizontally-polarized signal and a vertically-polarized signal, as a pair of linearly polarized signals, provided by a corresponding RF front end chip, such as RF front end chips 106x and 106y.

It should be understood that wireless transceiver 101 may assign only a portion of reconfigurable receive/transmit antennas 116a through 116w to operate in the transmission mode, while assign another portion of reconfigurable receive/transmit antennas 116a through 116w to operate in the reception mode. For example, reconfigurable receive/transmit antennas 116a and 116b, although both coupled to RF front end chip 106x, may be assigned to different operation modes, with one in the transmission mode and the other one in the reception mode.

In one implementation, master chip 180 is configured to drive in parallel control buses 110a through 110y. By way of one example, and without limitation, control buses 110a through 110y are ten-bit control buses in the present implementation. In one implementation, RF front end chips 106a through 106y, and all the receive, transmit, and reconfigurable transmit/receiver antennas coupled to corresponding RF front end chips 106a through 106y, and master chip 180 are integrated on a single substrate, such as a printed circuit board.

Figure 2A:
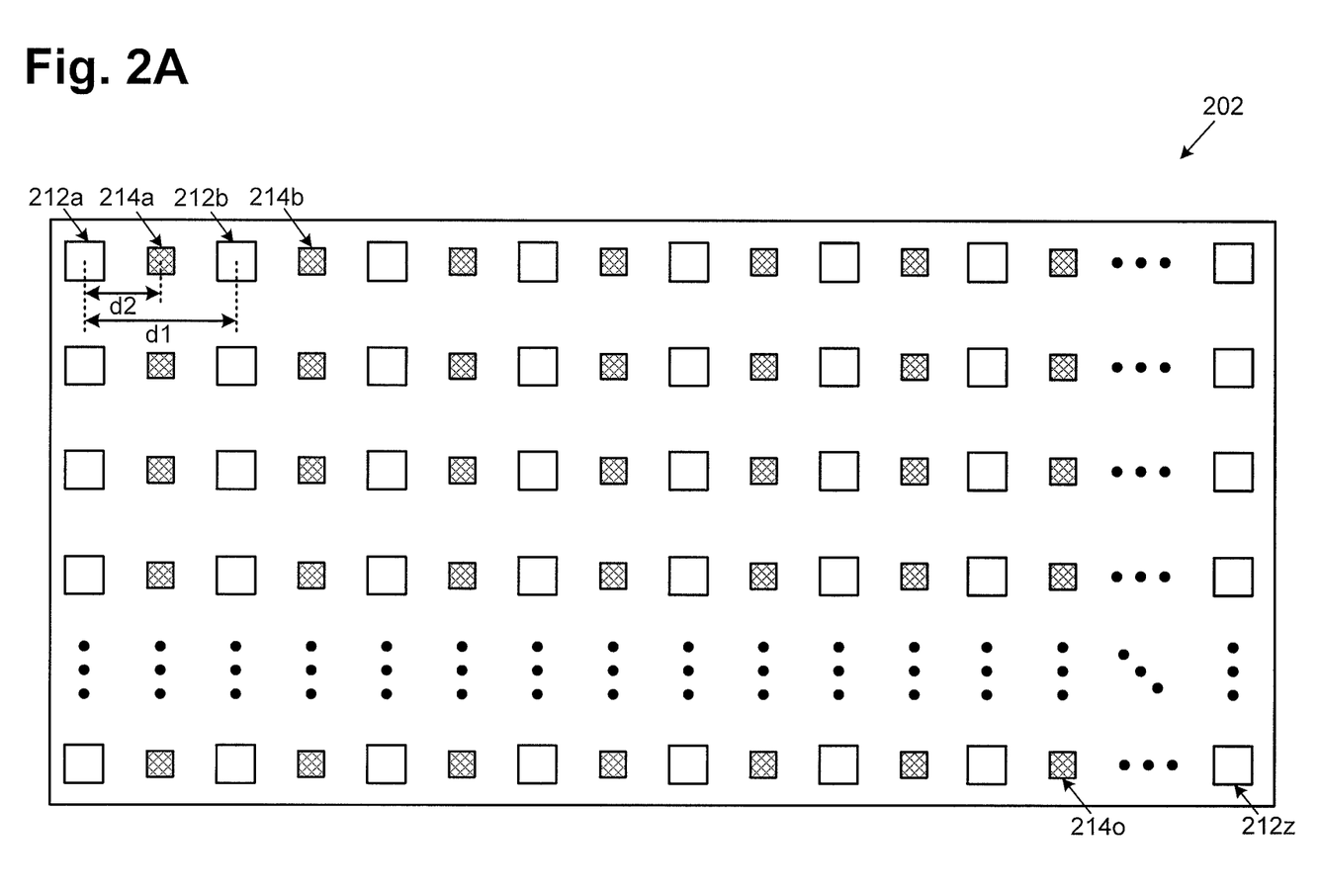
FIG. 2A illustrates a top plan view of a portion of a phased array antenna panel of an exemplary wireless transceiver according to one implementation of the present application.

Referring now to FIG. 2A, FIG. 2A illustrates a top plan view of a portion of a phased array antenna panel of an exemplary wireless transceiver according to one implementation of the present application. As illustrated in FIG. 2A, phased array antenna panel 202 includes receive antennas, such as receive antennas 212a, 212b and 212z (collectively referred to as receive antennas 212a through 212z). Phased array antenna panel 202 also includes transmit antennas, such as transmit antennas 214a, 214b and 214o (collectively referred to as transmit antennas 214a through 214o). As illustrated in FIG. 2A, receive antennas 212a through 212z and transmit antennas 214a through 214o form an alternating configuration where receive antennas 212a through 212z and transmit antennas 214a through 214o are approximately evenly interspaced in phased array antenna panel 202.

As shown in FIG. 2A, receive antennas 212a and 212b are separated by distance d1, while receive antenna 212a and transmit antenna 214a are separated by distance d2. In the present implementation, d1=2×d2. In other words, each of the transmit antennas is approximately half-way between two of the receive antennas. In another implementation, there may be multiple transmit antennas between every pair of immediately adjacent receive antennas. In one implementation, the total number of receive antennas 212a through 212z is greater than the total number of transmit antennas 214a through 214o. In another implementation, the total number of receive antennas 212a through 212z and the total number of transmit antennas 214a through 214o may vary to suit the specific needs of a particular application.

As illustrated in FIG. 2A, transmit antennas 214a through 214o in phased array antenna panel 202 may each have a substantially square shape that is slightly smaller than receive antennas 212a through 212z. This is because the receive frequency and the transmit frequency of the wireless transceiver are set to be different to ensure signal isolation between the receive and transmit signals. For example, receive antennas 212a through 212z in phased array antenna panel 202 may receive signals having a receive frequency of approximately 10 GHz, while transmit antennas 214a through 214o in phased array antenna panel 202 may transmit signals having a transmit frequency of approximately 12 GHz. As such, the receive frequency and the transmit frequency are separated by approximately 2 GHz to ensure signal isolation.

In one implementation, receive antennas 212a through 212z in phased array antenna panel 202 as shown in FIG. 2A, may be configured to receive signals from one or more wireless transmitters, such as commercial geostationary communication satellites or low earth orbit satellites having a very large bandwidth in the 10 GHz to 20 GHz frequency range and a very high data rate. In one implementation, for a wireless transmitter, such as satellite 360 in FIG. 3, transmitting signals at 10 GHz (i.e., $\lambda \approx 30$ mm), each receive antenna in phased array antenna panel 202 needs an area of at least a quarter wavelength (e.g., $\lambda/4 \approx 7.5$ mm) by a quarter wavelength (e.g., $\lambda/4 \approx 7.5$ mm) to receive the transmitted signals. As illustrated in FIG. 2A, receive antennas 212a through 212z in phased array antenna panel 202 may each have a substantially square shape having dimensions of 7.5 mm by 7.5 mm, for example. In one implementation, each adjacent pair of receive antennas may be separated by a distance of a multiple integer of the quarter wavelength (i.e., $n*\lambda/4$), such as 7.5 mm, 15 mm, 22.5 mm, and etc.

In one implementation, transmit antennas 214a through 214o in phased array antenna panel 202 as shown in FIG. 2A, may be configured to transmit signals to one or more wireless receivers, such as commercial geostationary communication satellites or low earth orbit satellites having a very large bandwidth in the 10 GHz to 20 GHz frequency range and a very high data rate. In one implementation, transmit antennas 214a through 214o may transmit signals at 12 GHz (i.e., $\lambda \approx 25$ mm) to a wireless receiver, such as satellite 360 in FIG. 3. Each transmit antenna in phased array antenna panel 202 needs an area of at least a quarter wavelength (e.g., $\lambda/4 \approx 6.25$ mm) by a quarter wavelength (e.g., $\lambda/4 \approx 6.25$ mm) to transmit signals at 12 GHz. As illustrated in FIG. 2A, transmit antennas 214a through 214o in phased array antenna panel 202 may each have a substantially square shape having dimensions of 6.25 mm by 6.25 mm, for example. In one implementation, each adjacent pair of transmit antennas may be separated by a distance of a multiple integer of the quarter wavelength (i.e., $n*\lambda/4$), such as 6.25 mm, 12.5 mm, 18.75 mm, and etc.

In another implementation, using much smaller antenna sizes, transmit antennas 214a through 214o in phased array antenna panel 202 may be configured to transmit signals in the 60 GHz frequency range, while receive antennas 212a through 212z in phased array antenna panel 202 may also be configured to receive signals in the 60 GHz frequency range, sometimes referred to as "60 GHz communications," which involve transmission and reception of millimeter wave signals. Among the applications for 60 GHz communications are wireless personal area networks, wireless high-definition television signal and Point-to-Point links. In that implementation, transmit antennas 214a through 214o and receive antennas 212a through 212z in phased array antenna panel 202 may have substantially equal sizes (that are both generally much smaller than antenna sizes used in 10 GHz or 12 GHz communications).

In the present implementation, phased array antenna panel 202 is a flat panel array employing receive antennas 212a through 212z and transmit antennas 214a through 214o, where phased array antenna panel 202 is coupled to associated active circuits to form beams for reception and transmission. In one implementation, the reception beam is formed fully electronically by means of phase and amplitude control circuits, for example, in RF front end circuits (such as RF front end chips 106a, 106b and 106e in FIG. 1) associated with receive antennas 212a through 212z. In one implementation, the transmission beam is formed fully electronically by means of phase and amplitude control circuits, for example, in RF front end circuits (such as RF front end chips 106c, 106d and 106e in FIG. 1) associated with transmit antennas 214a through 214o. Thus, phased array antenna panel 202 can provide for beamforming for both reception and transmission without the use of any mechanical parts, thereby reducing signal delay, implementation cost and complexity.

Figure 2B:
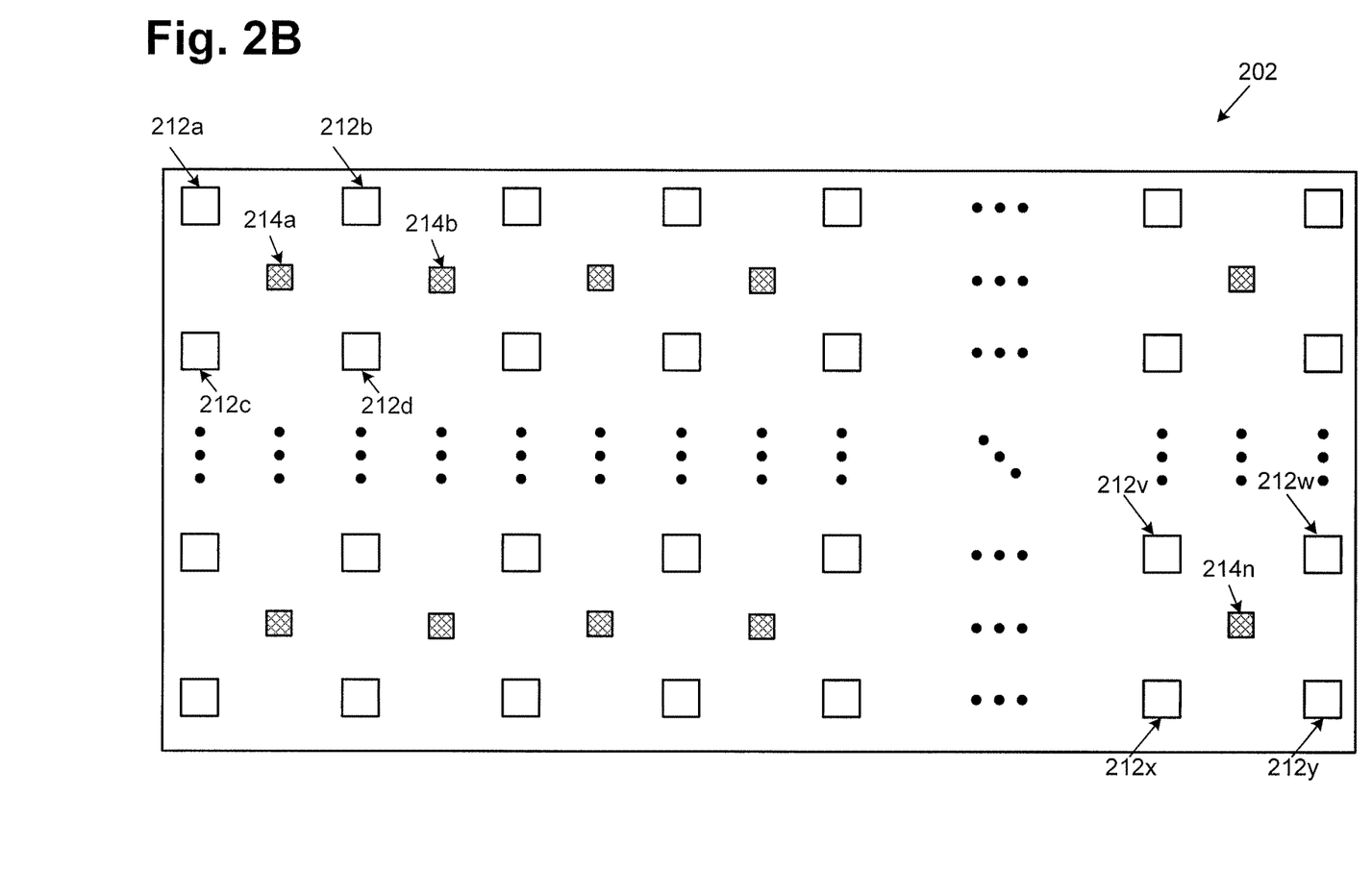
FIG. 2B illustrates a top plan view of a portion of a phased array antenna panel of an exemplary wireless transceiver according to one implementation of the present application.

Referring now to FIG. 2B, FIG. 2B illustrates a top plan view of a portion of a phased array antenna panel of an exemplary wireless transceiver according to one implementation of the present application. As illustrated in FIG. 2B, phased array antenna panel 202 includes receive antennas, such as receive antennas 212a, 212b, 212c, 212d, 212v, 212w, 212x and 212y (collectively referred to as receive antennas 212a through 212y). Phased array antenna panel 202 also includes transmit antennas, such as transmit antennas 214a, 214b and 214n (collectively referred to as transmit antennas 214a through 214n). As illustrated in FIG. 2B, receive antennas 212a through 212y and transmit antennas 214a through 214n form a staggered row configuration where receive antennas 212a through 212y and transmit antennas 214a through 214n are arranged in staggered rows. As illustrated in FIG. 2B, transmit antenna 214a is approximately centered between receive antennas 212a, 212b, 212c and 212d, where transmit antenna 214a is spaced from each of receive antennas 212a, 212b, 212c and 212d at substantially equal distances. Similarly, transmit antenna 214n is approximately centered between receive antennas 212v, 212w, 212x and 212y, where transmit antenna 214n is spaced from each of receive antennas 212v, 212w, 212x and 212y at substantially equal distances. In another implementation, there may be multiple transmit antennas between every group of four receive antennas. In one implementation, the total number of receive antennas 212a through 212y is greater than the total number of transmit antennas 214a through 214n. In another implementation, the total number of receive antennas 212a through 212y and the total number of transmit antennas 214a through 214n may vary to suit the specific needs of a particular application.

As illustrated in FIG. 2B, transmit antennas 214a through 214n in phased array antenna panel 202 may each have a substantially square shape, that is slightly smaller than receive antennas 212a through 212y. Similar to FIG. 2A, this is because the receive frequency and the transmit frequency of the wireless transceiver may be set to be different to ensure signal isolation between the receive and transmit signals. For example, receive antennas 212a through 212y in phased array antenna panel 202 may receive signals having a receive frequency of approximately 10 GHz, while transmit antennas 214a through 214n in phased array antenna panel 202 may transmit signals having a transmit frequency of approximately 12 GHz. As such, the receive frequency and the transmit frequency are separated by approximately 2 GHz to ensure signal isolation.

In one implementation, receive antennas 212a through 212y in phased array antenna panel 202 as shown in FIG. 2B, may be configured to receive signals from one or more wireless transmitters, such as commercial geostationary communication satellites or low earth orbit satellites having a very large bandwidth in the 10 GHz to 20 GHz frequency range and a very high data rate. In one implementation, for a wireless transmitter, such as satellite 360 in FIG. 3, transmitting signals at 10 GHz (i.e., $\lambda \approx 30$ mm), each receive antenna in phased array antenna panel 202 needs an area of at least a quarter wavelength (e.g., $\lambda/4 \approx 7.5$ mm) by a quarter wavelength (e.g., $\lambda/4 \approx 7.5$ mm) to receive signals. As illustrated in FIG. 2B, receive antennas 212a through 212y in phased array antenna panel 202 may each have a substantially square shape having dimensions of 7.5 mm by 7.5 mm, for example. In one implementation, each adjacent pair of receive antennas may be separated by a distance of a multiple integer of the quarter wavelength (i.e., $n*\lambda/4$), such as 7.5 mm, 15 mm, 22.5 mm, and etc.

In one implementation, transmit antennas 214a through 214n in phased array antenna panel 202 as shown in FIG. 2B, may be configured to transmit signals to one or more wireless receivers, such as commercial geostationary communication satellites or low earth orbit satellites having a very large bandwidth in the 10 GHz to 20 GHz frequency range and a very high data rate. In one implementation, transmit antennas 214a through 214n may transmit signals at 12 GHz (i.e., $\lambda \approx 25$ mm) to a wireless receiver, such as satellite 360 in FIG. 3. Each transmit antenna in phased array antenna panel 202 needs an area of at least a quarter wavelength (e.g., $\lambda/4 \approx 6.25$ mm) by a quarter wavelength (e.g., $\lambda/4 \approx 6.25$ mm) to transmit signals. As illustrated in FIG. 2B, transmit antennas 214a through 214n in phased array antenna panel 202 may each have a substantially square shape having dimensions of 6.25 mm by 6.25 mm, for example. In one implementation, each adjacent pair of transmit antennas may be separated by a distance of a multiple integer of the quarter wavelength (i.e., $n*\lambda/4$), such as 6.25 mm, 12.5 mm, 18.75 mm, and etc.

In another implementation, using much smaller antenna sizes, transmit antennas 214a through 214n in phased array antenna panel 202 may be configured to transmit signals in the 60 GHz frequency range, while receive antennas 212a through 212y in phased array antenna panel 202 may also be configured to receive signals in the 60 GHz frequency range. In that implementation, transmit antennas 214a through 214n and receive antennas 212a through 212y in phased array antenna panel 202 may have substantially equal sizes (that are both generally much smaller than antenna sizes used in 10 GHz or 12 GHz communications).

In the present implementation, phased array antenna panel 202 is a flat panel array employing receive antennas 212a through 212y and transmit antennas 214a through 214n, where phased array antenna panel 202 is coupled to associated active circuits to form beams for reception and transmission. In one implementation, the reception beam is formed fully electronically by means of phase and amplitude control circuits, for example, in RF front end circuits (such as RF front end chips 106a and 106b in FIG. 1) associated with receive antennas 212a through 212y. In one implementation, the transmission beam is formed fully electronically by means of phase and amplitude control circuits, for example, in RF front end circuits (such as RF front end chips 106c and 106d in FIG. 1) associated with transmit antennas 214a through 214n. Thus, phased array antenna panel 202 can provide for beamforming for both reception and transmission without the use of any mechanical parts, thereby reducing signal delay, implementation cost and complexity.

Figure 2C:
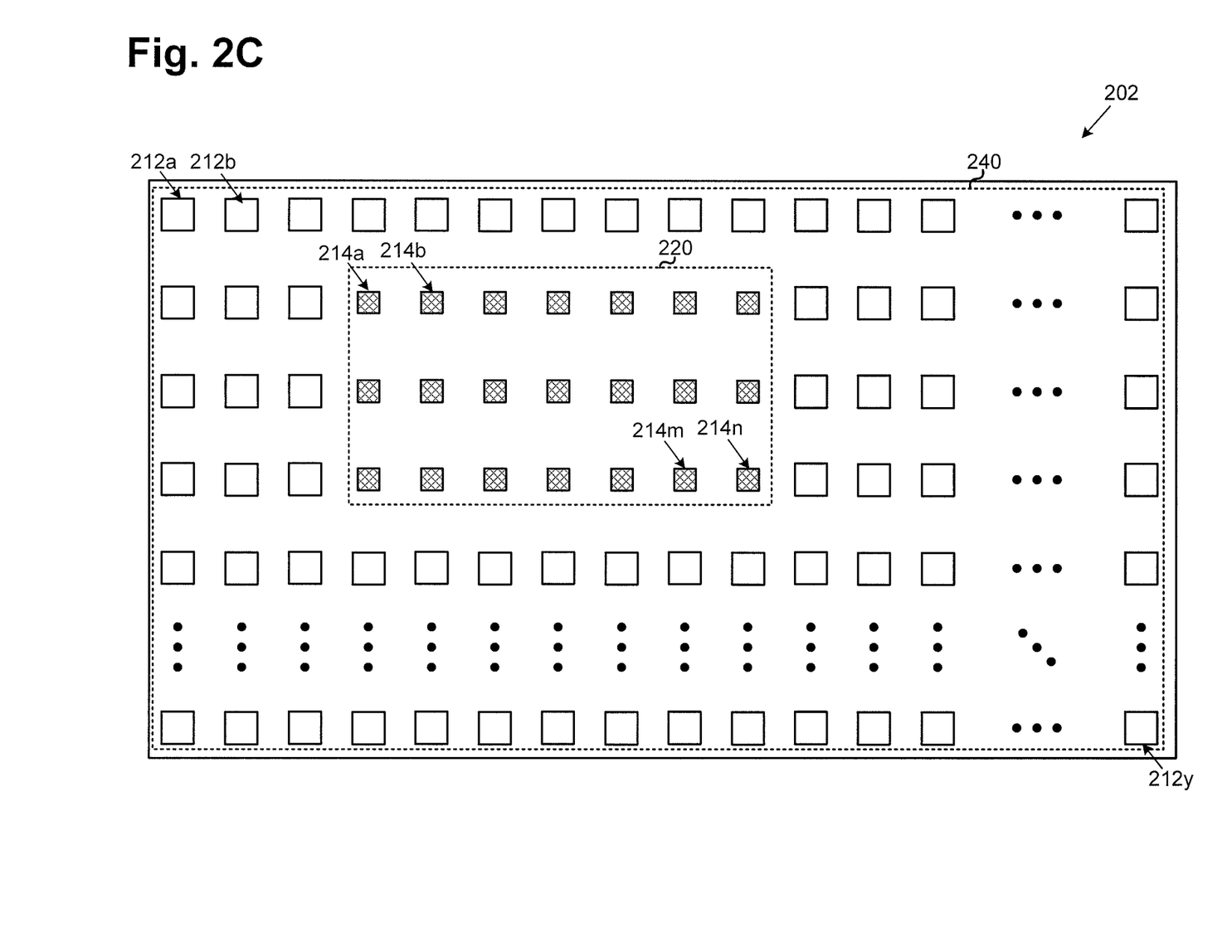
FIG. 2C illustrates a top plan view of a portion of a phased array antenna panel of an exemplary wireless transceiver according to one implementation of the present application.

Referring now to FIG. 2C, FIG. 2C illustrates a top plan view of a portion of a phased array antenna panel of an exemplary wireless transceiver according to one implementation of the present application. As illustrated in FIG. 2C, phased array antenna panel 202 includes receive antennas, such as receive antennas 212a, 212b and 212y (collectively referred to as receive antennas 212a through 212y). Phased array antenna panel 202 also includes transmit antennas, such as transmit antennas 214a, 214b, 214m and 214n (collectively referred to as transmit antennas 214a through 214n).

As illustrated in FIG. 2C, receive antennas 212a through 212y are in receive configuration 240. In the present implementation, receive configuration 240 includes a cluster of receive antennas. Transmit antennas 214a through 214n are in transmit configuration 220. In the present implementation, transmit configuration 220 includes a rectangular cluster of transmit antennas. As illustrated in FIG. 2C, the cluster of transmit antennas 214a through 214n is a rectangular cluster of transmit antennas surrounded by the cluster of receive antennas 212a through 212y. In one implementation, the total number of receive antennas 212a through 212y is greater than the total number of transmit antennas 214a through 214n. In another implementation, the number of receive antennas in receive configuration 240 and the number of transmit antennas in transmit configuration 220 may vary to suit the specific needs of a particular application.

In one implementation, receive antennas 212a through 212y and transmit antennas 214a through 214n in phased array antenna panel 202 may be configured to communicate with one or more wireless transceivers, such as commercial geostationary communication satellites or low earth orbit satellites having a very large bandwidth in the 10 GHz to 20 GHz frequency range and a very high data rate. As illustrated in FIG. 2C, similar to FIGS. 2A and 2B, transmit antennas 214a through 214n may each have a substantially square shape, that is slightly smaller than receive antennas 212a through 212y. For example, receive antennas 212a through 212*y* may receive signals having a receive frequency of approximately 10 GHz, while transmit antennas 214*a* through 214*n* may transmit signals having a transmit frequency of approximately 12 GHz. As such, the receive frequency and the transmit frequency are separated by approximately 2 GHz to ensure signal isolation.

Figure 3:
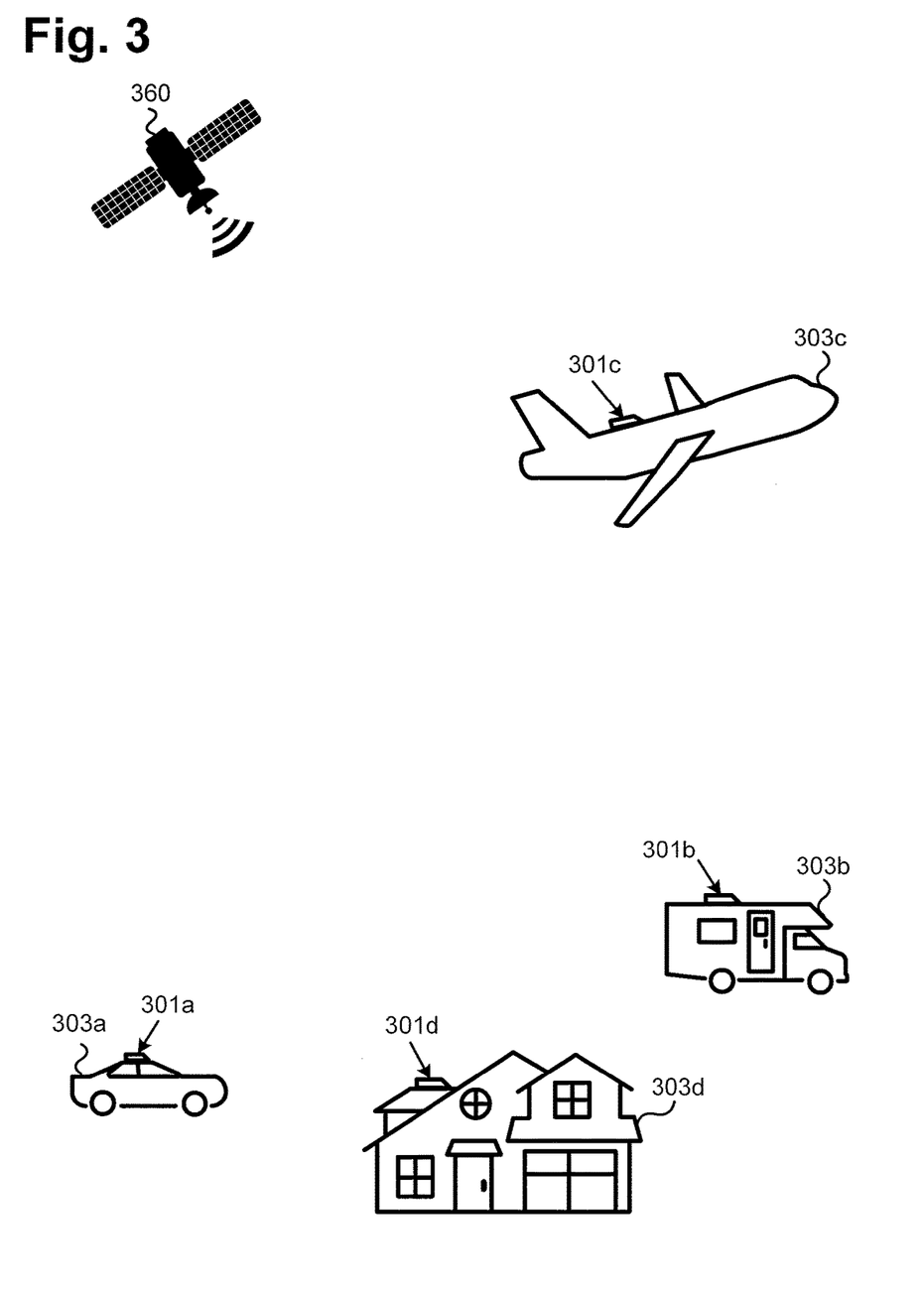
FIG. 3 is an exemplary wireless communications system utilizing exemplary wireless transceivers according to one implementation of the present application.

In one implementation, for a wireless transmitter, such as satellite 360 in FIG. 3, transmitting signals at 10 GHz (i.e., λ≈30 mm), each receive antenna in phased array antenna panel 202 needs an area of at least a quarter wavelength (e.g., λ/4≈7.5 mm) by a quarter wavelength (e.g., λ/4≈7.5 mm) to receive signals. In one implementation, each adjacent pair of receive antennas may be separated by a distance of a multiple integer of the quarter wavelength (i.e., n*λ/4), such as 7.5 mm, 15 mm, 22.5 mm, and etc. In one implementation, transmit antennas 214*a* through 214*n* may transmit signals at 12 GHz (i.e., λ≈25 mm) to a wireless receiver, such as satellite 360 in FIG. 3. Each transmit antenna in phased array antenna panel 202 needs an area of at least a quarter wavelength (e.g., λ/4≈6.25 mm) by a quarter wavelength (e.g., λ/4≈6.25 mm) to transmit signals. In one implementation, each adjacent pair of transmit antennas may be separated by a distance of a multiple integer of the quarter wavelength (i.e., n*λ/4), such as 6.25 mm, 12.5 mm, 18.75 mm, and etc.

In another implementation, using much smaller antenna sizes, transmit antennas 214*a* through 214*n* in phased array antenna panel 202 may be configured to transmit signals in the 60 GHz frequency range, while receive antennas 212*a* through 212*y* in phased array antenna panel 202 may also be configured to receive signals in the 60 GHz frequency range. In that implementation, transmit antennas 214*a* through 214*n* and receive antennas 212*a* through 212*y* in phased array antenna panel 202 may have substantially equal sizes (that are both generally much smaller than antenna sizes used in 10 GHz or 12 GHz communications).

In the present implementation, phased array antenna panel 202 is a flat panel array employing receive antennas 212*a* through 212*y* and transmit antennas 214*a* through 214*n*, where phased array antenna panel 202 is coupled to associated active circuits to form beams for reception and transmission. In one implementation, the reception beam is formed fully electronically by means of phase and amplitude control circuits, for example, in RF front end circuits (such as RF front end chips 106*a* and 106*b* in FIG. 1) associated with receive antennas 212*a* through 212*y*. In one implementation, the transmission beam is formed fully electronically by means of phase and amplitude control circuits, for example, in RF front end circuits (such as RF front end chips 106*c* and 106*d* in FIG. 1) associated with transmit antennas 214*a* through 214*n*. Thus, phased array antenna panel 202 can provide for beamforming for both reception and transmission without the use of any mechanical parts, thereby reducing signal delay, implementation cost and complexity.

Figure 2D:
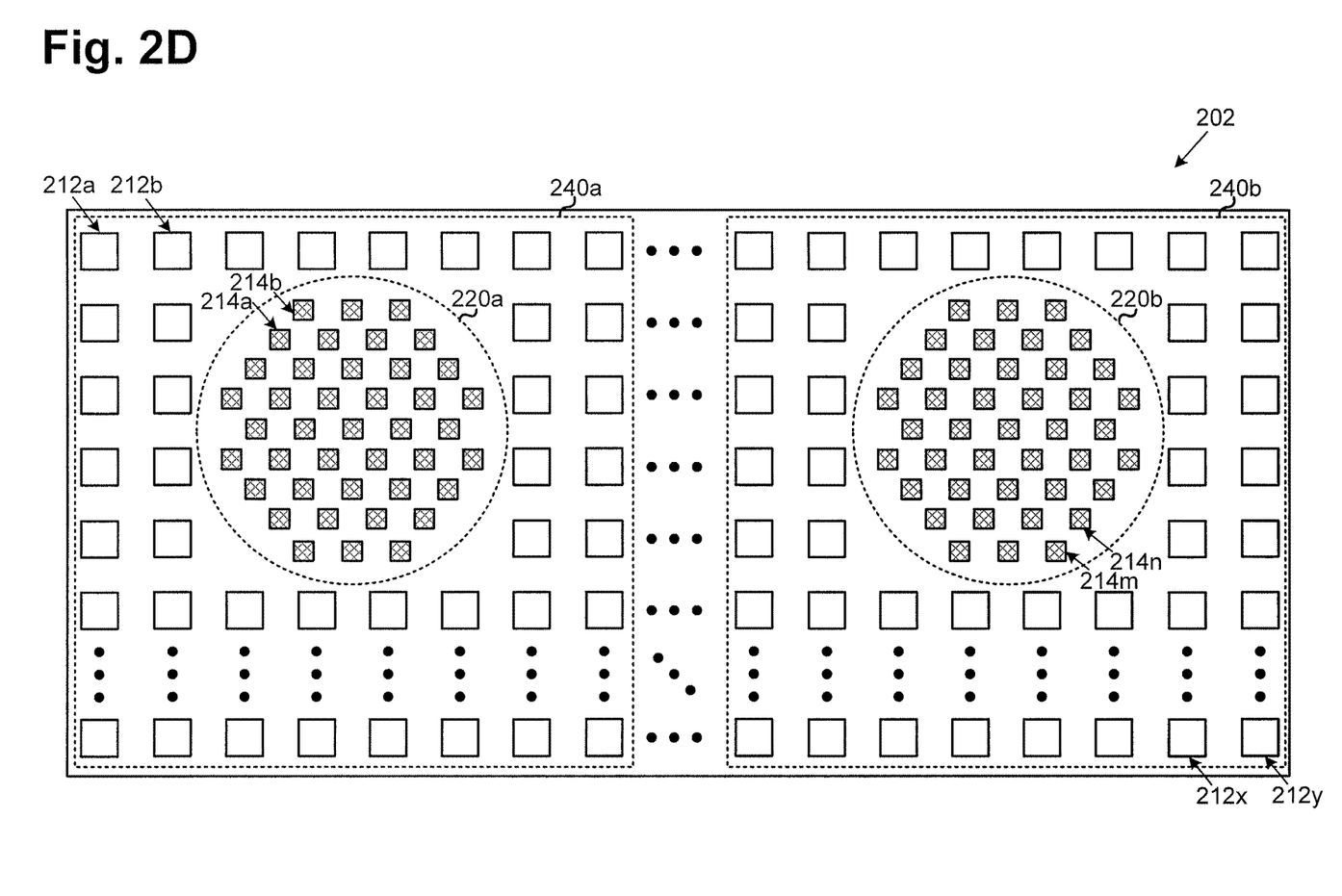
FIG. 2D illustrates a top plan view of a portion of a phased array antenna panel of an exemplary wireless transceiver according to one implementation of the present application.

Referring now to FIG. 2D, FIG. 2D illustrates a top plan view of a portion of a phased array antenna panel of an exemplary wireless transceiver according to one implementation of the present application. As illustrated in FIG. 2D, phased array antenna panel 202 includes receive antennas, such as receive antennas 212*a*, 212*b*, 212*x* and 212*y* (collectively referred to as receive antennas 212*a* through 212*y*). Phased array antenna panel 202 also includes transmit antennas, such as transmit antennas 214*a*, 214*b*, 214*m* and 214*n* (collectively referred to as transmit antennas 214*a* through 214*n*).

As illustrated in FIG. 2D, a portion of receive antennas 212*a* through 212*y* are in receive configuration 240*a*, while another portion of receive antennas 212*a* through 212*y* are in receive configuration 240*b*. In the present implementation, each of receive configurations 240*a* and 240*b* includes a cluster of receive antennas. As further illustrated in FIG. 2D, a portion of transmit antennas 214*a* through 214*n* is in transmit configuration 220*a*, while another portion of transmit antennas 214*a* through 214*n* is in transmit configuration 220*b*. In the present implementation, each of transmit configurations 220*a* and 220*b* is a non-rectangular cluster of transmit antennas. As shown in FIG. 2D, the cluster of transmit antennas in transmit configuration 220*a* is a substantially circular cluster of transmit antennas surrounded by the cluster of receive antennas in receive configuration 240*a*. Similarly, the cluster of transmit antennas in transmit configuration 220*b* is a substantially circular cluster of transmit antennas surrounded by the cluster of receive antennas in receive configuration 240*b*.

In one implementation, the total number of receive antennas 212*a* through 212*y* is greater than the total number of transmit antennas 214*a* through 214*n*. In another implementation, the number of receive antennas in receive configuration 240*a* and the number of transmit antennas in transmit configuration 220*a* may vary to suit the needs of a particular application. Similarly, the number of receive antennas in receive configuration 240*b* and the number of transmit antennas in transmit configuration 220*b* may vary to suit the needs of a particular application.

In one implementation, receive antennas 212*a* through 212*y* and transmit antennas 214*a* through 214*n* in phased array antenna panel 202 may be configured to communicate with one or more wireless transceivers, such as commercial geostationary communication satellites or low earth orbit satellites having a very large bandwidth in the 10 GHz to 20 GHz frequency range and a very high data rate. As illustrated in FIG. 2D, transmit antennas 214*a* through 214*n* may each have a substantially square shape, that is slightly smaller than receive antennas 212*a* through 212*y*. For example, receive antennas 212*a* through 212*y* may receive signals having a receive frequency of approximately 10 GHz, while transmit antennas 214*a* through 214*n* may transmit signals having a transmit frequency of approximately 12 GHz. As such, the receive frequency and the transmit frequency are separated by approximately 2 GHz to ensure signal isolation.

In one implementation, for a wireless transmitter, such as satellite 360 in FIG. 3, transmitting signals at 10 GHz (i.e., λ≈30 mm), each receive antenna in phased array antenna panel 202 needs an area of at least a quarter wavelength (e.g., λ/4≈7.5 mm) by a quarter wavelength (e.g., λ/4≈7.5 mm) to receive signals. In one implementation, transmit antennas 214*a* through 214*n* may transmit signals at 12 GHz (i.e., λ≈25 mm) to a wireless receiver, such as satellite 360 in FIG. 3. Each transmit antenna in phased array antenna panel 202 needs an area of at least a quarter wavelength (e.g., λ/4≈6.25 mm) by a quarter wavelength (e.g., λ/4≈6.25 mm) to transmit signals. In one implementation, each adjacent pair of transmit antennas may be separated by a distance of a multiple integer of the quarter wavelength (i.e., n*λ/4), such as 6.25 mm, 12.5 mm, 18.75 mm, and etc.

In another implementation, using much smaller antenna sizes, transmit antennas 214*a* through 214*n* in phased array antenna panel 202 may be configured to transmit signals in the 60 GHz frequency range, while receive antennas 212*a* through 212*y* in phased array antenna panel 202 may also be configured to receive signals in the 60 GHz frequency range. In that implementation, transmit antennas 214*a* through 214*n* and receive antennas 212*a* through 212*y* in phased array antenna panel 202 may have substantially equal sizes (that are both generally much smaller than antenna sizes used in 10 GHz or 12 GHz communications).

In the present implementation, phased array antenna panel 202 is a flat panel array employing receive antennas 212a through 212y and transmit antennas 214a through 214n, where phased array antenna panel 202 is coupled to associated active circuits to form beams for reception and transmission. In one implementation, the reception beam is formed fully electronically by means of phase and amplitude control circuits, for example, in RF front end circuits (such as RF front end chips 106a and 106b in FIG. 1) associated with receive antennas 212a through 212y. In one implementation, the transmission beam is formed fully electronically by means of phase and amplitude control circuits, for example, in RF front end circuits (such as RF front end chips 106c and 106d in FIG. 1) associated with transmit antennas 214a through 214n. Thus, phased array antenna panel 202 can provide for beamforming for both reception and transmission without the use of any mechanical parts, thereby reducing signal delay, implementation cost and complexity.

Figure 2E:
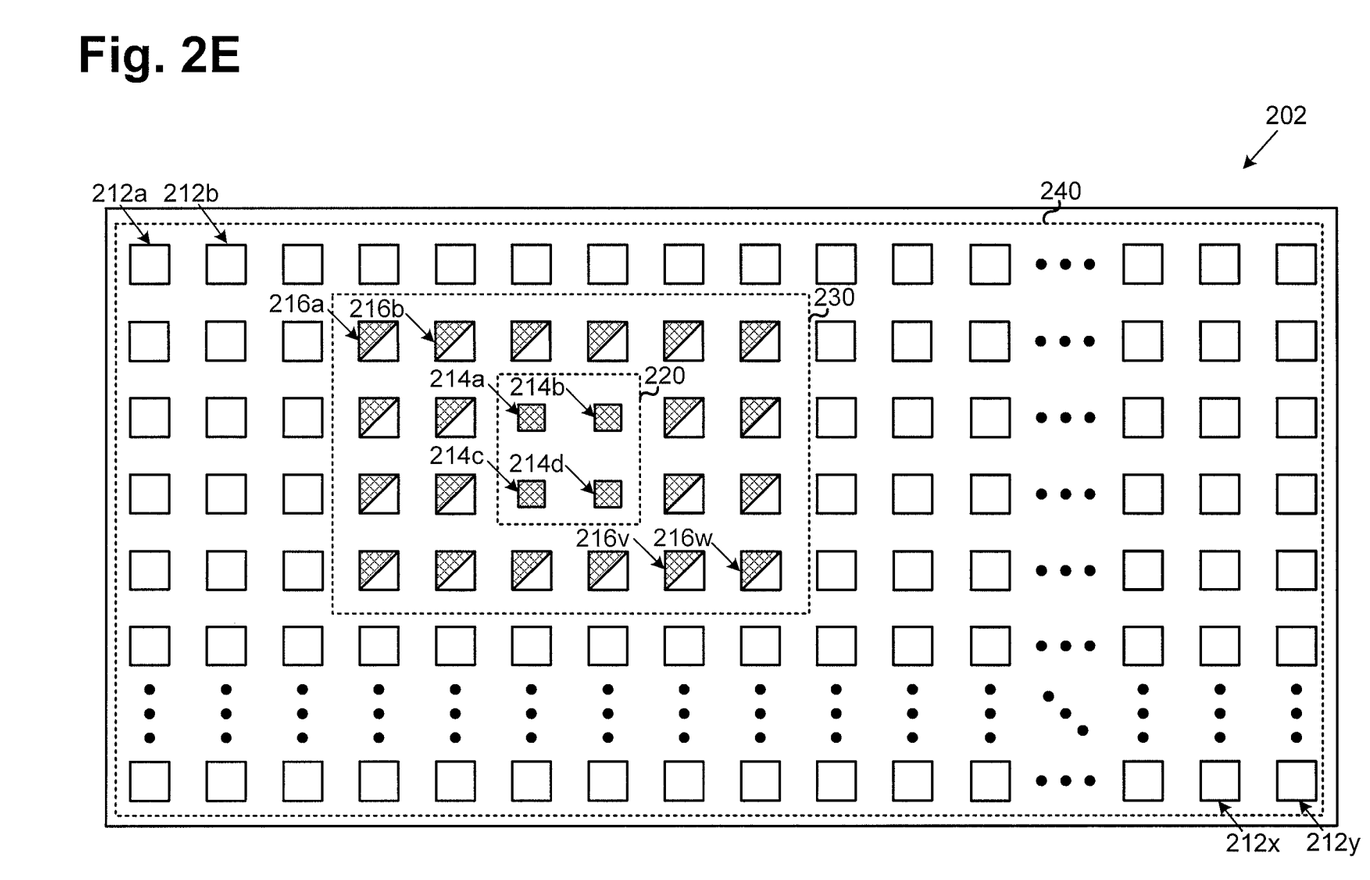
FIG. 2E illustrates a top plan view of a portion of a phased array antenna panel of an exemplary wireless transceiver according to one implementation of the present application.

Referring now to FIG. 2E, FIG. 2E illustrates a top plan view of a portion of a phased array antenna panel of an exemplary wireless transceiver according to one implementation of the present application. As illustrated in FIG. 2E, phased array antenna panel 202 includes receive antennas, such as receive antennas 212a, 212b, 212x and 212y (collectively referred to as receive antennas 212a through 212y). Phased array antenna panel 202 also includes transmit antennas, such as transmit antennas 214a, 214b, 214c and 214d (collectively referred to as transmit antennas 214a through 214d). Phased array antenna panel 202 further includes reconfigurable receive/transmit antennas, such as reconfigurable receive/transmit antennas 216a, 216b, 216v and 216w (collectively referred to as reconfigurable receive/transmit antennas 216a through 216w).

As illustrated in FIG. 2E, receive antennas 212a through 212y are in receive configuration 240, which includes a cluster of receive antennas. Also, transmit antennas 214a through 214d are in transmit configuration 220, which includes a rectangular cluster of transmit antennas. In addition, reconfigurable receive/transmit antennas 216a through 216w are in reconfigurable receive/transmit configuration 230, which includes a rectangular cluster of reconfigurable receive/transmit antennas. As shown in FIG. 2E, the cluster of transmit antennas in transmit configuration 220 is surrounded by the cluster of reconfigurable receive/transmit antennas in reconfigurable receive/transmit configuration 230. The cluster of reconfigurable receive/transmit antennas in reconfigurable receive/transmit configuration 230 is in turn surrounded by the cluster of receive antennas in receive configuration 240.

In the present implementation, a wireless transceiver is configured to dynamically assign reconfigurable receive/transmit antennas 216a through 216w so that each of reconfigurable receive/transmit antennas 216a through 216w may operate in either the transmission mode or in the reception mode. As a consequence, the total number of transmit antennas or the total number of receive antennas in phased array antenna panel 202 may be increased. In other words, depending on the specific needs of a particular application, the wireless transceiver may assign one or more reconfigurable receive/transmit antennas 216a through 216w to operate in the transmission mode along with transmit antennas 214a through 214d to transmit signals, or operate in the reception mode along with receive antennas 212a through 212y to receive signals. In one implementation, the number of receive antennas in receive configuration 240, the number of reconfigurable receive/transmit antennas in reconfigurable receive/transmit configuration 230, and the number of transmit antennas in transmit configuration 220a may vary to suit the specific needs of a particular application.

In one implementation, receive antennas 212a through 212y, transmit antennas 214a through 214d, and reconfigurable receive/transmit antennas 216a through 216w in phased array antenna panel 202 may be configured to communicate with one or more wireless transceivers, such as commercial geostationary communication satellites or low earth orbit satellites having a very large bandwidth in the 10 GHz to 20 GHz frequency range and a very high data rate. As illustrated in FIG. 2E, transmit antennas 214a through 214d may each have a substantially square shape, that is slightly smaller than receive antennas 212a through 212y. For example, receive antennas 212a through 212y may receive signals having a receive frequency of approximately 10 GHz, while transmit antennas 214a through 214d may transmit signals having a transmit frequency of approximately 12 GHz. As such, the receive frequency and the transmit frequency are separated by approximately 2 GHz to ensure signal isolation.

In one implementation, for a wireless transmitter, such as satellite 360 in FIG. 3, transmitting signals at 10 GHz (i.e., $\lambda \approx 30$ mm), each receive antenna in phased array antenna panel 202 needs an area of at least a quarter wavelength (e.g., $\lambda/4 \approx 7.5$ mm) by a quarter wavelength (e.g., $\lambda/4 \approx 7.5$ mm) to receive signals. In one implementation, transmit antennas 214a through 214d may transmit signals at 12 GHz (i.e., $\lambda \approx 25$ mm) to a wireless receiver, such as satellite 360 in FIG. 3. Each transmit antenna in phased array antenna panel 202 needs an area of at least a quarter wavelength (e.g., $\lambda/4 \approx 6.25$ mm) by a quarter wavelength (e.g., $\lambda/4 \approx 6.25$ mm) to transmit signals. In one implementation, each reconfigurable receive/transmit antenna in phased array antenna panel 202 may have a substantially square shape that is substantially equal to the area of each of receive antennas 212a through 212y. In another implementation, each reconfigurable receive/transmit antenna in phased array antenna panel 202 may have a substantially square shape that is substantially equal to the area of each of transmit antennas 214a through 214d. In yet another implementation, each reconfigurable receive/transmit antenna in phased array antenna panel 202 may have a substantially square shape that is greater in size than transmit antennas 214a through 214d, but smaller in size than receive antennas 212a through 212y.

In another implementation, using much smaller antenna sizes, transmit antennas 214a through 214d in phased array antenna panel 202 may be configured to transmit signals in the 60 GHz frequency range, while receive antennas 212a through 212y in phased array antenna panel 202 may also be configured to receive signals in the 60 GHz frequency range. In that implementation, transmit antennas 214a through 214d, receive antennas 212a through 212y, and reconfigurable receive/transmit antennas 216a through 216w in phased array antenna panel 202 may have substantially equal sizes (that are both generally much smaller than antenna sizes used in 10 GHz or 12 GHz communications).

In the present implementation, phased array antenna panel 202 is a flat panel array employing receive antennas 212a through 212y, transmit antennas 214a through 214d, and reconfigurable receive/transmit antennas 216a through 216w, where phased array antenna panel 202 is coupled to associated active circuits to form beams for reception and transmission. In one implementation, the reception beam is formed fully electronically by means of phase and amplitude control circuits, for example, in RF front end circuits (such as RF front end chips 106a, 106b, 106x and 106y in FIG. 1) associated with receive antennas 212a through 212y and reconfigurable receive/transmit antennas 216a through 216w. In one implementation, the transmission beam is formed fully electronically by means of phase and amplitude control circuits, for example, in RF front end circuits (such as RF front end chips 106c, 106d, 106x and 106y in FIG. 1) associated with transmit antennas 214a through 214d and reconfigurable receive/transmit antennas 216a through 216w. Thus, phased array antenna panel 202 can provide for beamforming for both reception and transmission without the use of any mechanical parts, thereby reducing signal delay, implementation cost and complexity.

Figure 2F:
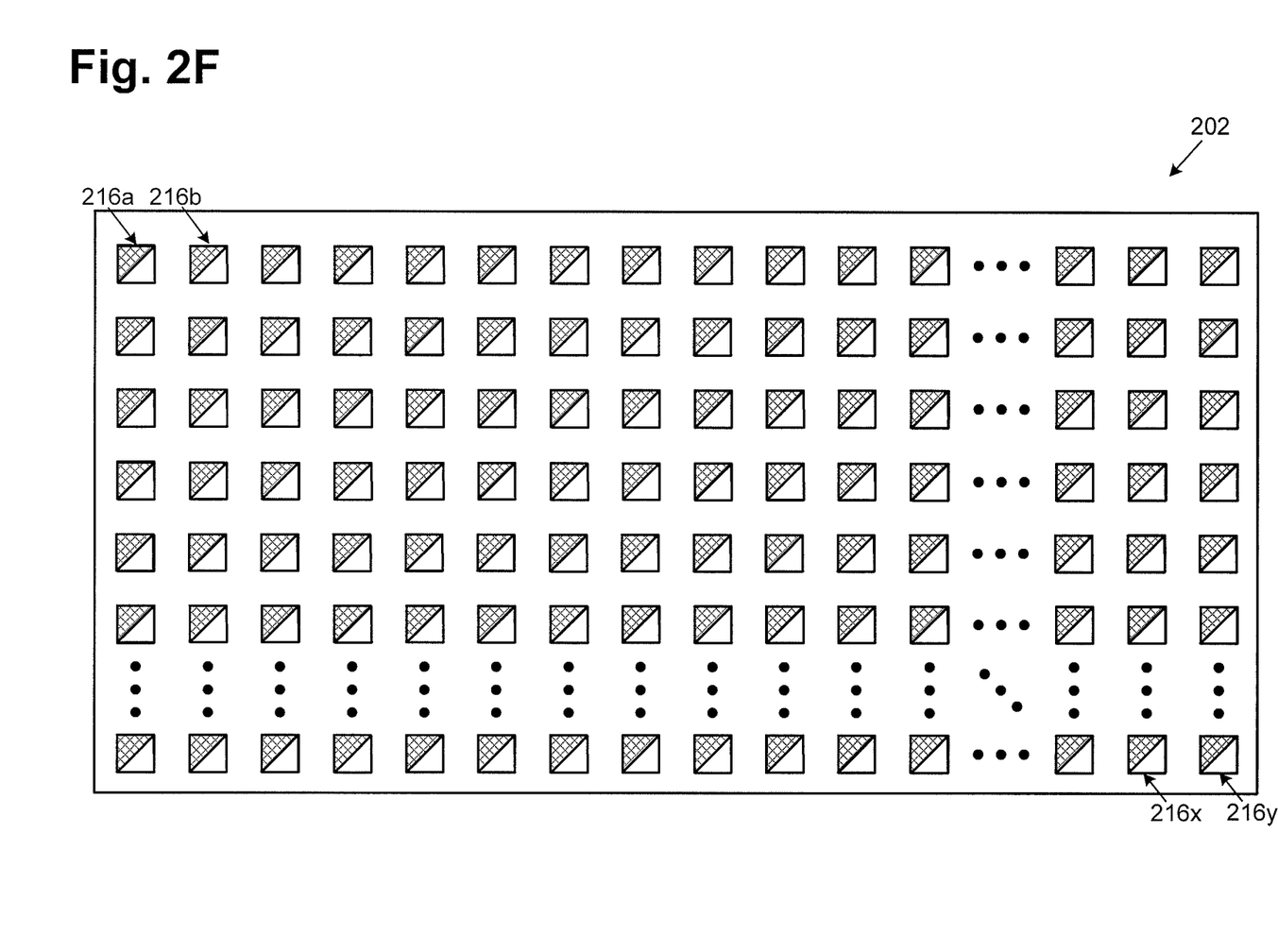
FIG. 2F illustrates a top plan view of a portion of a phased array antenna panel of an exemplary wireless transceiver according to one implementation of the present application.

Referring now to FIG. 2F, FIG. 2F illustrates a top plan view of a portion of a phased array antenna panel of an exemplary wireless transceiver according to one implementation of the present application. As illustrated in FIG. 2F, phased array antenna panel 202 includes reconfigurable receive/transmit antennas 216a, 216b, 216x and 216y (collectively referred to as reconfigurable receive/transmit antennas 216a through 216y). In the present implementation, substantially every or in fact every antenna in phased array antenna panel 202 is reconfigurable, such that the wireless transceiver is configured to dynamically assign each of the reconfigurable receive/transmit antennas to operate in either the reception mode or the transmission mode.

For example, the wireless transceiver may dynamically assign a portion of reconfigurable receive/transmit antennas 216a through 216y to form a receive configuration to operate in the reception mode, while assign another portion of reconfigurable receive/transmit antennas 216a through 216y to form a transmit configuration to operate in the transmission mode. In one implementation, the wireless transceiver may dynamically assign reconfigurable receive/transmit antennas 216a through 216y to form one or more transmit configurations and one or more receive configurations, as shown and described with reference to FIGS. 2A through 2E above.

In one implementation, reconfigurable receive/transmit antennas 216a through 216y in phased array antenna panel 202 may be configured to communicate with one or more wireless transceivers, such as commercial geostationary communication satellites or low earth orbit satellites having a very large bandwidth in the 10 GHz to 20 GHz frequency range and a very high data rate. As illustrated in FIG. 2F, reconfigurable receive/transmit antennas 216a through 216y may each have a substantially square shape. In one implementation, each of reconfigurable receive/transmit antennas 216a through 216y in phased array antenna panel 202 needs an area of at least a quarter wavelength (e.g., λ/4≈7.5 mm) by a quarter wavelength (e.g., λ/4≈7.5 mm) to receive signals at 10 GHz. These dimensions can also be used to transmit signals at 12 GHz. In one implementation, each of reconfigurable receive/transmit antennas 216a through 216y in phased array antenna panel 202 needs an area of at least a quarter wavelength (e.g., λ/4≈6.25 mm) by a quarter wavelength (e.g., λ/4≈6.25 mm) to transmit signals at 12 GHz. These dimensions can also be used to receive signals at 10 GHz. In another implementation, each of reconfigurable receive/transmit antennas 216a through 216y in phased array antenna panel 202 may be configured to transmit or receive signals in the 60 GHz frequency range using much smaller antenna sizes.

In the present implementation, phased array antenna panel 202 is a flat panel array employing reconfigurable receive/transmit antennas 216a through 216y, where phased array antenna panel 202 is coupled to associated active circuits to form beams for reception and transmission. In one implementation, the reception beam is formed fully electronically by means of phase and amplitude control circuits, for example, in RF front end circuits (such as RF front end chips 106x and 106y in FIG. 1) associated with a portion of reconfigurable receive/transmit antennas 216a through 216y. In one implementation, the transmission beam is formed fully electronically by means of phase and amplitude control circuits, for example, in RF front end circuits (such as RF front end chips 106x and 106y in FIG. 1) associated with another portion reconfigurable receive/transmit antennas 216a through 216y. Thus, phased array antenna panel 202 can provide for beamforming for both reception and transmission without the use of any mechanical parts.

Referring now to FIG. 3, FIG. 3 illustrates an exemplary wireless communications system utilizing exemplary wireless transceivers according to one implementation of the present application. As illustrated in FIG. 3, satellite 360 is configured to communicate (e.g., transmit and receive data and/or signals) with various wireless transceivers, such as wireless transceiver 301a mounted on car 303a, wireless transceiver 301b mounted on recreational vehicle 303b, wireless transceiver 301c mounted on airplane 303c and wireless transceiver 301d mounted on house 303d. It should be understood that car 303a, recreational vehicle 303b and airplane 303c may each be moving, thereby causing a change in position of corresponding wireless transceivers 301a through 301c. It should be understood that, although house 303d can be stationary, the relative position of wireless transceiver 301d to satellite 360 may also change, for example, due to wind or other factors. In the present implementation, wireless transceivers 301a through 301d may each correspond to wireless transceiver 101 in FIG. 1, where each of wireless transceivers 301a through 301d may include a phased array antenna panel, such as any of the phased array antenna panels 202 in FIGS. 2A through 2F, for concurrently transmitting and receiving wireless signals, as discussed above.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A wireless transceiver using a phased array antenna panel for concurrently transmitting and receiving wireless signals, said wireless transceiver comprising:
   receive antennas forming a receive configuration;
   transmit antennas forming a transmit configuration;
   said receive antennas forming a receive beam at a receive frequency based on phase and amplitude information provided by an RF front end chip that is connected to a master chip in said phased array antenna panel;

said transmit antennas forming a transmit beam at a transmit frequency based on phase and amplitude information provided by said master chip in said phased array antenna panel.

2. The wireless transceiver of claim 1 wherein said phase and amplitude information for said transmit antennas is provided by said RF front end chip that is connected to said master chip.

3. The wireless transceiver of claim 1 wherein said phase and amplitude information for said transmit antennas is provided by another RF front end chip that is connected to said master chip.

4. The wireless transceiver of claim 1 wherein said receive configuration and said transmit configuration form an alternating configuration of said receive and said transmit antennas.

5. The wireless transceiver of claim 4 wherein each of said transmit antennas is approximately half-way between two of said receive antennas.

6. The wireless transceiver of claim 1 wherein said receive configuration and said transmit configuration form a staggered row configuration of said receive and said transmit antennas.

7. The wireless transceiver of claim 6 wherein each of said transmit antennas is approximately centered between four of said receive antennas.

8. The wireless transceiver of claim 1 wherein said receive configuration is a cluster of receive antennas, and said transmit configuration is a cluster of transmit antennas.

9. The wireless transceiver of claim 8 wherein said cluster of transmit antennas is a rectangular cluster of transmit antennas surrounded by said cluster of receive antennas.

10. The wireless transceiver of claim 8 wherein said cluster of transmit antennas is a non-rectangular cluster of transmit antennas surrounded by said cluster of receive antennas.

11. The wireless transceiver of claim 1 wherein said transmit antennas are smaller than receive antennas.

12. The wireless transceiver of claim 1 wherein said transmit antennas and said receive antennas have substantially equal sizes.

13. The wireless transceiver of claim 1 wherein said receive frequency and said transmit frequency are separated by approximately 2 GHz.

14. The wireless transceiver of claim 1 wherein a total number of said receive antennas is greater than a total number of said transmit antennas.

15. A wireless transceiver using a phased array antenna panel for concurrently transmitting and receiving wireless signals, said wireless transceiver comprising:
receive antennas forming a receive configuration;
transmit antennas forming a transmit configuration;
reconfigurable receive/transmit antennas;
said receive antennas forming a receive beam at a receive frequency based on phase and amplitude information provided by an RF front end chip that is connected to a master chip in said phased array antenna panel;
said transmit antennas forming a transmit beam at a transmit frequency based on phase and amplitude information provided by said master chip in said phased array antenna panel;
wherein said wireless transceiver is configured to dynamically assign said reconfigurable receive/transmit antennas so as to increase a number of said transmit antennas or increase a number of said receive antennas.

16. The wireless transceiver of claim 15 wherein said reconfigurable receive/transmit antennas is a reconfigurable cluster of receive/transmit antennas.

17. The wireless transceiver of claim 16 wherein said reconfigurable cluster of receive/transmit antennas is surrounded by a cluster of receive antennas.

18. The wireless transceiver of claim 15 wherein said receive frequency and said transmit frequency are separated by approximately 2 GHz.

19. A wireless transceiver using a phased array antenna panel for concurrently transmitting and receiving wireless signals, said wireless transceiver comprising:
reconfigurable receive/transmit antennas;
said reconfigurable receive/transmit antennas forming a receive beam at a receive frequency based on phase and amplitude information provided by an RF front end chip that is connected to a master chip in said phased array antenna panel;
said reconfigurable receive/transmit antennas forming a transmit beam at a transmit frequency based on phase and amplitude information provided by said master chip in said phased array antenna panel;
wherein said wireless transceiver is configured to dynamically assign said reconfigurable receive/transmit antennas so as to increase a number of transmit antennas or increase a number of receive antennas.

* * * * *